United States Patent [19]

Isomura et al.

[11] Patent Number: 5,227,940
[45] Date of Patent: Jul. 13, 1993

[54] COMPOSITE MAGNETIC HEAD

[75] Inventors: Tatsuya Isomura; Osamu Shimizu, both of Minamiashigara; Satoshi Yoshida, Hachioji; Kanji Nakanishi, Hadano, all of Japan

[73] Assignee: Fuji Photo Film Co., Ltd., Kanagawa, Japan

[21] Appl. No.: 728,498

[22] Filed: Jul. 11, 1991

[30] Foreign Application Priority Data

Jul. 13, 1990 [JP] Japan .................. 2-184161

[51] Int. Cl.$^5$ .............................. G11B 5/23
[52] U.S. Cl. ......................... 360/126; 360/119; 360/120; 360/121; 360/122; 360/125
[58] Field of Search ............. 360/126, 125, 122, 121, 360/120, 119

[56] References Cited

U.S. PATENT DOCUMENTS

| 4,768,118 | 8/1988 | Kuriyama | 360/121 |
| 4,953,049 | 8/1990 | Okuda et al. | 360/126 |
| 5,031,063 | 7/1991 | Hasegawa | 360/120 |
| 5,117,321 | 5/1992 | Nakanishi et al. | 360/120 |

FOREIGN PATENT DOCUMENTS

| 0380136 | 8/1990 | European Pat. Off. . | |
| 62-210607 | 9/1987 | Japan . | |
| 63-298806 | 12/1988 | Japan | 360/125 |
| 1-229408 | 9/1989 | Japan . | |

OTHER PUBLICATIONS

Patent Abstracts of Japan, Abstract of Published Application No. 1-100714 to Tatsuo Hisamura, Apr. 19, 1989.
IEEE Transactions on Magnetics, vol. MAG 23, No. 5, (Part II of Two Parts) Sep. 1987, "Recording Characteristics Of Metal-In-Gap Mini Composite Head", T. Nishiyama et al, pp. 2931-2933.
IEEE Transactions on Magnetics, vol. MAG 20, No. 5, Sep. 84, "Analysis of Metal-In-Gap Heads" J. J. M. Ruigrok, pp. 872-874.

*Primary Examiner*—Constantine Hannaher
*Attorney, Agent, or Firm*—Sughrue, Mion, Zinn, Macpeak & Seas

[57] ABSTRACT

A composite magnetic head comprises a pair of magnetic core halves each including a core block formed of an oxide magnetic material and a soft magnetic thin film disposed on said core block interposed with a reaction inhibiting layer, said core halves abutting to each other so that a magnetic gap is defined between the ends of said soft magnetic thin films. The magnetic head has a size relation $bcd/a \leq 0.2 \times 10^{-10}$ m$^2$ wherein a is a gap length, measured along the proceeding direction of a magnetic recording medium, c a gap depth, d a gap width as measured along the track width and b is a thickness of said reaction inhibiting layer. Wavy (beat) noise of output signal due to the psuedo gap produced by the reaction inhibiting layer is effectively suppressed.

11 Claims, 10 Drawing Sheets

10 kG | 5 Oe (a) AS DEPO 10 kG | 5 Oe (b) AFTER HEAT TREATED AT 350° C 10 kG | 5 Oe (c) AFTER HEAT TREATED AT 550° C

Fe 91.2 Zr 3.9 N 4.9

COMPOSITE MAGNETIC HEAD

FIELD OF THE INVENTION

This invention relates to a composite magnetic head and, more particularly, to a composite magnetic head in which a pair of magnetic core halves each including a core block formed of an oxide magnetic material and a soft magnetic thin film formed on each core block are abutted to each other.

BACKGROUND

Recently, in apparatus associated with magnetic recording, such as video tape recorders (VTRs), hard disk devices (HDDs) or floppy disk devices (FDDs), it has been attempted to raise the recording density of recording signals. To this end, a hard magnetic material exhibiting high coercivity and high residual magnetic flux density is employed as a magnetic material of the magnetic recording medium. Thus it has become necessary to use a soft magnetic material having a higher saturation magnetic flux density and a high magnetic permeability than heretofore as a soft magnetic material which is employed in a magnetic head adapted for writing magnetic recording signals on the magnetic recording medium.

For this reason, a composite magnetic head having a magnetic core of the type in which thin films formed of a magnetic metal material of a high saturation magnetic flux density are deposited on core blocks formed of an oxide magnetic material, such as ferrite, and thus exhibiting both the high saturation magnetic flux density and the high magnetic permeability, has come into use in place of conventional ferrite magnetic heads having a low magnetic flux density.

However, with the composite magnetic head, also known as a metal-in-gap (MIG) head, a reaction layer or diffusion layer is formed on the interface between the ferrite core and the soft magnetic metal material during heating to a higher temperature, such as during crystallization heat treatment of the soft magnetic film or glass fusion, indispensable in the manufacture process of the magnetic head, thus resulting in markedly lowered magnetic properties as the soft magnetic material in the reaction layer. Thus the reaction layer acts as a pseudo magnetic gap independently of the normal magnetic head.

Figure 5:
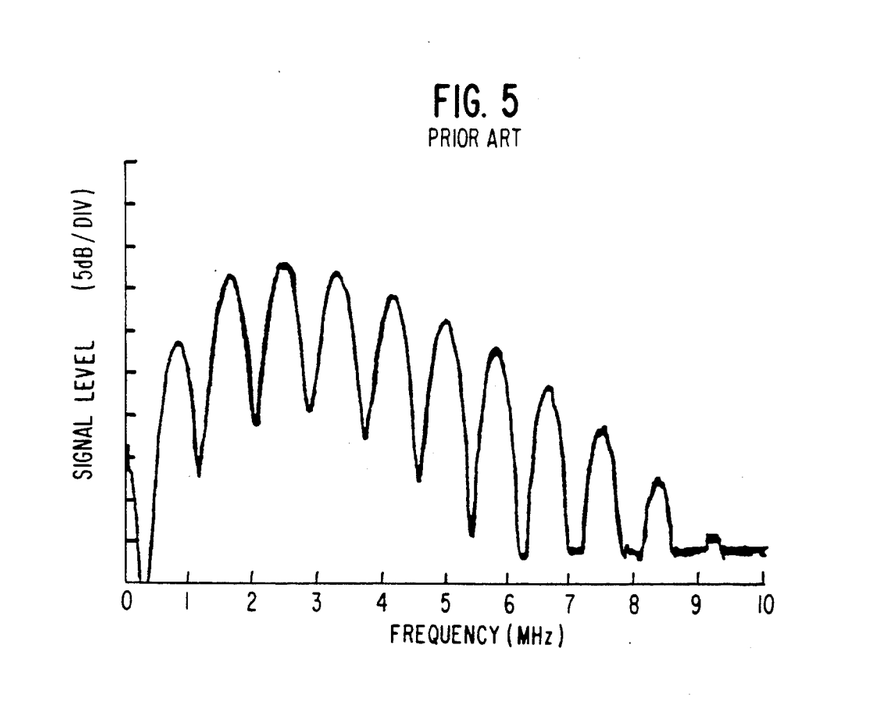
FIG. 5 is a graph showing general frequency characteristics of reproduced signals of a conventional composite magnetic head.

When the composite magnetic head is used as a magnetic head for signal reproduction, the pseudo magnetic gap, formed parallel to the normal magnetic gap, deteriorates the quality of reproduced signals. That is, due to interference with pseudo signals emanating from the pseudo magnetic gap, the reproduced signals exhibit wavy frequency (beat) characteristics having alternate crests and valleys, as shown in FIG. 5. The magnitude of waviness is expressed as a ratio in dB of the crests to the valleys of the output signals in the frequency characteristics shown in FIG. 5. The presence of the pseudo magnetic gap presents a serious problem because, if the magnitude of the waviness exceeds 1 dB, the composite magnetic head having such playback signal output can no longer be used practically for reproducing magnetic recording.

For obviating such problem, the JP Patent KOKAI publication No. 1-100714 (1989) discloses a composite magnetic head in which the reaction inhibiting layer containing an oxide(s) of Si, Ti, Cr, Al or the like is formed to a thickness of 2 to 20 nm in the boundary surface of the two magnetic materials.

However, it has been known theoretically that the magnitude of the waviness (beat) in the pseudo magnetic gap is a function of the ratio between the thickness of pseudo magnetic gap and the gap length of the normal magnetic gap (IEEE article, 0018-9464/84/0900-872S01.00, © 1984). Therefore, the thickness of the reaction inhibiting layer in the above mentioned Kokai Publication, acting as the pseudo gap, needs to be defined in connection with the gap length of the normal magnetic gap. However, in the composite magnetic head of the above mentioned Kokai Publication, no reference is made to this point in determining the thickness of the reaction inhibit layer.

SUMMARY OF THE DISCLOSURE

In view of the above mentioned problem of the waviness of the pseudo magnetic gap, and as a result of our studies centered on the thickness of the reaction inhibiting layer of the composite magnetic head from an aspect different from the above mentioned IEEE article, it is an object of the present invention to provide a composite magnetic head wherein satisfactory playback signals may be obtained by the provision of a reaction inhibiting layer whereby waviness signals may be suppressed to lower than a certain level.

For accomplishing the above object, the present invention provides a composite magnetic head comprising a pair of magnetic core halves each including a core block formed of an oxide magnetic material and a soft magnetic thin film disposed on said core block interposed with a reaction inhibiting layer, said core halves abutting to each other so that a magnetic gap is defined between the ends of said soft magnetic thin films, wherein the magnetic head has a size relation $$bcd/a \leq 0.2 \times 10^{-10} \text{ m}^2$$

wherein a is a gap length, as measured along the proceeding direction of a magnetic recording medium, c a gap depth as measured in the direction normal to the surface of said magnetic recording medium, d a gap width as measured along the track width of said magnetic recording medium, and b is a thickness of said reaction inhibiting layer.

The present invention is based on the following recognition.

If, in a composite magnetic head having a reaction inhibit layer, a magnetic reluctance of a normal magnetic gap is expressed as $r_m$, a magnetic reluctance of the reaction inhibiting layer or pseudo magnetic gap as $r_p$ and a magnetic reluctance of other core portions as $r_c$, a signal reproducing efficiency $\eta_m$ at the normal magnetic gap and a signal reproducing efficiency at the pseudo magnetic gap $\eta_p$ are expressed as $$\eta_m \propto \frac{r_m}{r_m + r_p + r_c}, \quad (1)$$

$$\eta_p \propto \frac{r_p}{r_m + r_p + r_c}$$

Since the waviness (beat) B is given by $$B \propto 20 \log \frac{\eta_m + \eta_p}{\eta_m - \eta_p}$$

by substituting the formula (1) into this formula, the following formula (2)

$$B \propto 20 \log \frac{r_m + r_p}{r_m - r_p} \quad (2)$$

is obtained.

Since the gap length of the pseudo gap is markedly shorter than that of the normal gap, the magnetic reluctance of the pseudo gap is markedly less than that of the normal magnetic gap, so that $r_p << r_m$. Thus the formula (2) may become $$\begin{aligned} B &\propto 20 \log \frac{r_m + r_p}{r_m - r_p} \quad (3) \\ &= 20 \log\left(1 + \frac{r_p}{r_m}\right) - 20 \log\left(1 - \frac{r_p}{r_m}\right) \\ &\approx 20 \times 2 \times \frac{r_p}{r_m} \end{aligned}$$

It is seen from this formula (3) that the waviness (beat) B is defined as the ratio of the magnetic reluctance of the pseudo magnetic gap $r_p$ to the magnetic reluctance $r_m$ of the normal magnetic gap.

The magnetic reluctance $r_m$ of the normal gap is expressed, in terms of a gap length a, a gap depth c, a gap width or track width d and magnetic permeability $\mu_o$ of the magnetic gap part, by $$r_m = \mu_o a / cd$$

whereas, since $r_p << r_m$, the magnetic reluctance $r_p$ of the pseudo magnetic gap may be thought to be approximately expressed, in terms of a thickness b of the reaction inhibiting layer, by $$r_p = kb$$

where k is a constant.

From these relations, the waviness (beat) B ultimately is proportional to bcd/a.

According to the present invention, inasmuch as the waviness (beat) produced in the reproduced signal from the composite magnetic head having the above mentioned reaction inhibiting layer has a magnitude determined by bcd/a where a to d denote the sizes of the composite magnetic head as defined hereinabove, the value of bcd/a for which the waviness (beat) in the reproduced signal in the composite magnetic head having the reaction inhibiting layer functioning as the pseudo gap is not more than a predetermined value (1 dB) is determined experimentally to determine the thickness b of the reaction inhibit layer. Meritorious Effects of the Invention.

With the recording/reproducing composite magnetic head having the reaction inhibiting layer, according to the present invention, high quality playback signals may be obtained, inasmuch as the thickness of the reaction inhibit layer may be set with a certain degree of freedom as a function of the sizes of the magnetic gap, and the magnitude of the waviness (beat) signal contained in the reproduced signals of a variety of composite magnetic heads having different size magnetic gaps may be easily suppressed to a practically acceptable value of not more than 1 dB.

Above all, with a composite magnetic head for reproducing signals recorded on a magnetic recording medium having a narrow track width due to high recording density, or with a composite magnetic head of the non-sliding access type, such as a magnetic head for HDDs, in which the gap depth may be set to a smaller value, the thickness of the reaction inhibiting layer b may be set to a larger value without increasing the waviness signal in the playback signals, so that the reaction inhibiting layer thick enough to prevent reaction between the oxide magnetic material and the non-magnetic film may be obtained. Despite the presence of the pseudo gap due to the enlarged thickness of the reaction inhibiting layer, a composite magnetic head may be provided in which the waviness signal contained in the reproduced signals is small and a practically acceptable signal quality of the reproduced signals may be maintained.

BASIC EXPERIMENTS

The magnetic head employed in the present experiment is a composite magnetic head having the composition and produced by the method as disclosed in the present applicant's senior JP Patent Application No. 1-204586 (1989), and is constituted by an MnZn single-crystalline ferrite as a ferrite substrate, an $SiO_2$ layer as a reaction inhibiting layer and a layer of $Fe_{80.9}Zr_{6.5}N_{12.6}$ (atomic percent) as a soft magnetic film. It has been heat treated at a temperature of 550° C.

EXPERIMENT 1

Figure 2:
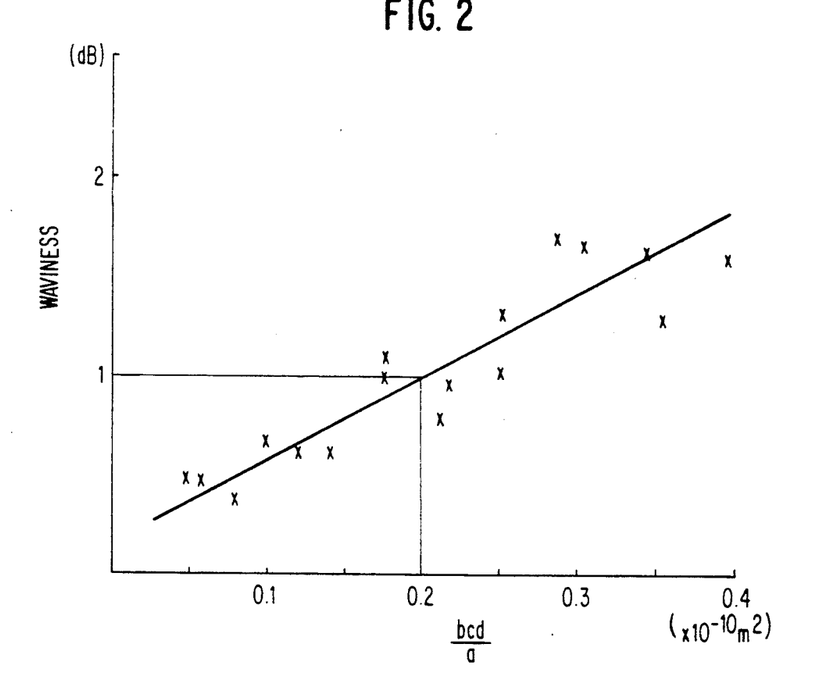
FIG. 2 is a graph showing measured values of the relation between a waviness signal and the values of a bcd/a defined by sizes a, c and d of a magnetic gap and a thickness b of the reaction inhibiting layer, as confirmed by Experiment 1 of the present invention.

FIG. 2 is a graph showing the results of measurement in Experiment 1, where a waviness component in the reproduced signal is represented as a function of bcd/a. The ordinate and the abscissa in the graph stand for bcd/a and the waviness (beat) in dB, respectively. In the present Experiment, the gap length a is fixed at $a=0.2$ μm, the thickness b of the reaction inhibiting layer is fixed at $b=0.01$ μm (10 nm) and the track width d is fixed at $d=25$ μm, while the gap depth c is variable within the range of from 30 μm to 0.

From FIG. 2, a value of the ratio bcd/a of the composite magnetic head $0.2 \times 10^{-10}$ m$^2$ defining a waviness of not more than 1 dB which is practically satisfactory as the reproduced signal quality, has been obtained.

That is, with a range of the ratio bcd/a larger than the above value, a significant waviness exceeding 1 dB is contained in the reproduced output signal, even though the thickness b of the reaction inhibiting layer is 100 Å hitherto thought to be an acceptably small value, so that the composite magnetic head is practically unusuable. In this manner, reproduced signals containing a waviness signal not more than 1 dB which is practically acceptable can be obtained only with the composite magnetic head having a value of bcd/a not more than $0.2 \times 10^{-10}$ m$^2$.

For example, if the track width d only is selected to the 10 μm ($d=10$ μm) while the gap length a is selected to be 0.2 μm ($a=0.2$ μm) and the gap depth c is selected to be 20 μm ($c=20$ μm), the thickness b of the reaction inhibiting layer is not more than 20 nm. Thus, even if the thickness b of the reaction inhibiting layer is increased to this value, the waviness may be suppressed to be not more than 1 dB, so that practically acceptable playback signals may be produced.

On the other hand, if only the gap depth c is set to 5 μm ($c=5$ μm), with the gap length a and the track width d remaining at 0.2 μm and 25 μm, respectively ($a=0.2$ μm, $d=25$ μm), the thickness b of the reaction inhibiting layer is not more than 32 nm ($b \leq 32$ nm) so that the thickness b of the reaction inhibiting layer may be increased up to this value. Although a lower value of the gap depth c in an order of 10 μm need to be set in the case of a magnetic head sliding on a magnetic recording medium, such as a floppy disk drive (FDD), the gap depth c may be reduced to 5 μm or less with a non-sliding magnetic head, as in a hard disc device (HDD), in which case sufficient reliability of the playback signals may be procured even if the thickness b of the reaction inhibiting layer is increased to this value.

For confirming the results of the Experiment 1, the following experiment 2 was conducted, in which only the gap width d was varied in a composite magnetic head produced otherwise by the same manner and having the same composition as in Experiment 1.

EXPERIMENT 2

As test samples of the composite magnetic heads, 20 heads each of a test sample group 1 and a test sample group 2 were prepared, in which the sizes a to d of the test sample group 1 were set so that $a=0.2$ μm, $b=10$ nm, $c=25$ μm and $d=15$ μm, whereas the sizes of the test sample group 2 were set so that $a=0.2$ μm, $b=10$ nm, $c=25$ μm and $d=15$ μm. Wavinesses contained in the reproduced signals of these composite magnetic heads were measured and the mean values as well as the fluctuations of the produced waviness are plotted, as shown in FIG. 3.

Figure 3:
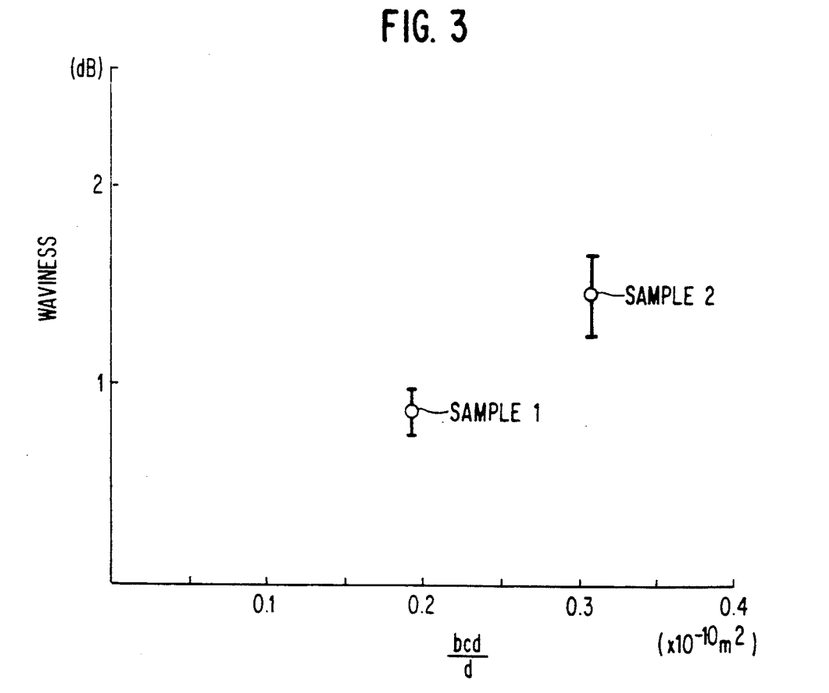
FIG. 3 is a graph similar to FIG. 2 and showing measured values of data by Experiment 2.

It is seen on FIG. 3 that fairly satisfactory playback signals with the waviness of not more than about 1 dB were obtained with the composite magnetic heads of the test sample group 1 with the value bcd/a equal to 0.19, whereas, with the composite magnetic heads of the test sample group 2 with the value bcd/a equal to 0.31, only reproduced signals containing the waviness in excess of 1 dB could be obtained.

As described hereinabove, it has been confirmed that satisfactory composite magnetic heads with a reduced waviness in the reproduced signals may be obtained with the ratio of bcd/a not more than 0.2, that is, $$bcd/a \leq 0.2$$

even if the value of d is changed, which confirmed the results of the Experiment 1.

DESCRIPTION OF THE PREFERRED EMBODIMENTS

For the value b, c or d, the following values are preferred, respectively: $b \geq 2 \times 10^{-9}$ m(20 Å), $c \leq 5 \times 10^{-6}$ m or $d \leq 10 \times 10^{-6}$ m. In the case with $b \geq 2$ nm (more preferably $\geq 3$ nm), the reaction inhibiting layer becomes more effective.

The composition of the starting materials and the method for production as disclosed in our copending JP Patent Application No. 1-204586 (1989) may be employed.

For example, ferrite is selected as a magnetic oxide material. In general, ferrite has a composition $MO.Fe_2O_3$ where M is a divalent metal ion and may for example be $Mn^{2+}$, $Fe^{2+}$, $Co^{2+}$, $Ni^{2+}$, $Cu^{2+}$ or $Zn^{2+}$, but may also be metal ions of higher valencies. An example of such ferrite is MnZn single-crystalline ferrite. $SiO_2$ is used as a reaction inhibiting layer and formed on a core block, formed by the above ferrite, by vapor deposition methods, such as by sputtering.

As a soft magnetic film, an alloy represented by a compositional formula $Fe_pZr_qN_r$, wherein p, q and r are expressed in atomic percent and satisfy the formulas $$0 < q < 20 \text{ and}$$

$$0 < r < 22$$

with the exclusion of the ranges $q \leq 7.5$ and $r \leq 5$.

Preferably, the value of p, q and r in the above composition satisfy the following formulas:

$$69 \leq p \leq 93,$$

$$2 \leq q \leq 15 \text{ and}$$

$$5.5 \leq r \leq 22.$$

Figure 6:
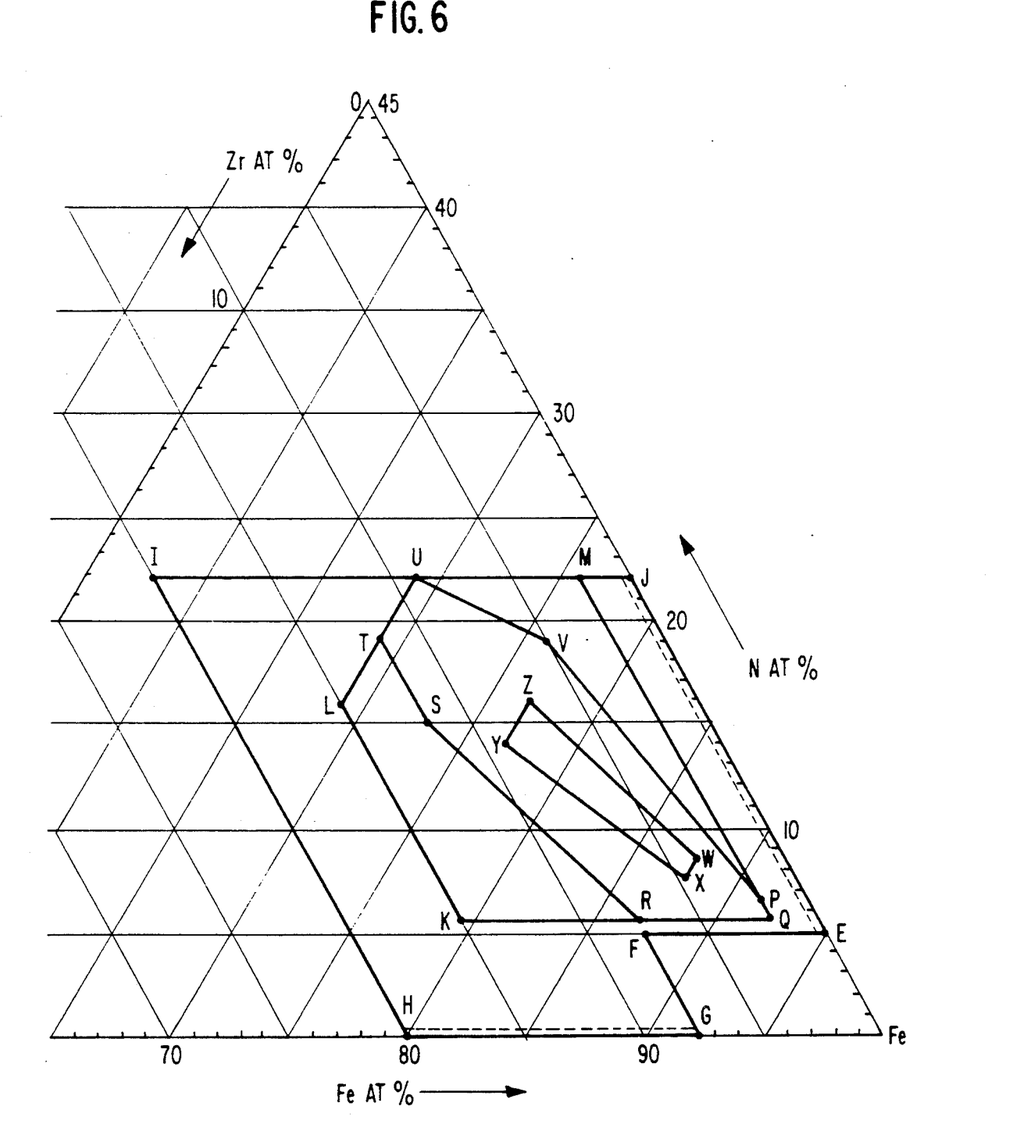
FIG. 6 is a diagram showing a compositional range of a preferred composite magnetic head according to the present invention.

The above compositional range is shown in FIG. 6 by points Q, K, L, U and M.

More preferably, the compositional range is defined by line segments interconnecting seven points

P (91, 2, 7)
Q (92.5, 2, 5.5)
R (87, 7.5, 5.5)
S (73, 12, 15)
T (69, 12, 19)

U (69, 9, 22)
V (76, 5, 19)
in a ternary coordinate system for three components (Fe, Zr, N). The compositional range is shown by points P, Q, R, S, T, U and V in FIG. 6.

Further, it is More preferred that the crystal grain size is 30 nm or less and the soft magnetic film exhibits uniaxial anisotropy.

With the ranges of q and r in the above compositional range of the soft magnetic film being $0 < q \leq 20$ and $0 < r \leq 22$, with the exclusion of the ranges $q \leq 7.5$ and $r \leq 5$, preferably the formulas $q \leq 0.5$ and $r \leq 0.5$ hold, because, with $q < 0.5$ and/or $r < 0.5$, the effects of the elements are occasionally indistinct.

If Zr exceed 20 atomic percent or N exceeds 22 atomic percent in the soft magnetic layer, satisfactory soft magnetism cannot be obtained.

If the compositional range of the soft magnetic layer is such that $69 \leq p \leq 93$, $2 \leq q \leq 15$ and $5.5 \leq r \leq 22$ better soft magnetism may be achieved.

More preferably, the above composition is within a range delimited by line segments interconnecting the above mentioned specific points P, Q, R, S, T, U and V in the ternary coordinate system of the three components (Fe, Zr, N). Within this compositional range, coercivity is particularly low so that the composition may be used advantageously as a core material for a magnetic head. Most preferred is the compositional range in which coercivity is 1.5 Oe or lower (or 1 Oe or lower).

A more preferred compositional range of the soft magnetic layer is a range indicated by $Fe_s(Zr_tN_{1-t})_{100-s}$, $77 \leq s \leq 88$ and $0.3 \leq t \leq 0.38$.

The compositional range is shown in FIG. 5 by points W, X, Y and Z. The coordinates of these points W, X, Y and Z are substantially expressed as

W(88, 3.6, 8.4)
X(88, 4.56, 7.44)
Y(77, 8.74, 14.26)
Z(77, 6.9, 16.1)

Within this range, the content of Fe is 77 to 88 atomic percent, while the ratio of the content q (in atomic percent) of N to the content r (in atomic percent of Zr in the soft magnetic layer, or the ration r/q, is approximately 1.63 to 2.33. The soft magnetic layer of the compositional range exhibits fairly satisfactory soft magnetism with coercivity Hc less than 5 Oe (Hc<5Oe).

In the soft magnetic layer, part of Zr (for example, 30 atomic percent of Zr constituting the soft magnetic layer) may be replaced by at least one of Hf, Ti, Nb, Ta, V, Mo and W.

Further, 30 atomic percent, for example, of Fe in the soft magnetic thin film may be replaced by at least one of Co, Ni and Ru.

Generally, as the soft magnetic film those having the following composition may be used advantageously:

$Fe_{p-m}M_mB_qN_r$ where p, q, r and m represent atomic percent, M represents at least one of Co, Ru, Cr, V, Ni, Mn, Pd, Ir and Pt, and B represents at least one of Zr, Hf, Ti, Nb, Ta, Mo and W, and $0 \leq m/p < 0.3$ $0 < q \leq 20$ $0 < r \leq 22$ provided that the range of $q \leq 7.5$ and $r \leq 5$ is excluded. Substantially the same holds as the case with the system $Fe_pZr_qN_r$ as shown in FIG. 6 with respect to the compositional ranges Q-K-L-U-M, P-Q-R-S-T-U-V or W-X-Y-Z, when Zr is replaced by "B" elements and/or Fe is partially replaced by "M" elements.

This soft magnetic film offers following advantages through the partial substitution of M for Fe. The magnetostriction can be exactly adjusted to a value (absolute value) close to zero or increased toward positive direction proportionally to the amount of M elements. The saturation magnetic flux density Bs can be further increased (particularly in the case of Co). A few Oe (at least about 2 Oe) of the anisotropic magnetic field strength can be given even at a smallest magnetostriction, resulting in high permeability at high frequency (particularly for Co). Corrosion resistance can be further improved (particularly in the case with M being Cr, Co, Ni, Pd, Ir, Pt and/or Ru). Electric resistivity can be enhanced so as to reduse eddy current loss, resulting in high permeability even used at high frequency (particularly in the case with M being V, Cr and/or Mn).

An alloy target having a composition $Fe_{100-y}Zr_y$ (y=5.0, 10.0, 15.0) was produced and high frequency sputtering was carried out in an argon gas atmosphere containing 2.5 to 12.5 mol percent of nitrogen under the conditions of a gas pressure of 0.6 Pa and an input power of 200 W to produce amorphous alloy thin films of various compositions. These thin films were heat-treated in a magnetic field to produce a soft magnetic thin film, of which saturation magnetic flux density Bs and coercivity Hc were measured using an atternate BH tracer with an applied magnetic field of 50 Hz and 25 Oe (90 Oe for Hc>25). A crystallized glass substrate PEG3130C manufactured by HOYA or a single-crystalline sapphire substrate were used as a substrate. The film thickness for each case was an order of 0.6 μm.

The results are shown in Table 1, wherein Hc is the value as measured along an axis of easy magnetigation. For certain soft magnetic thin films, magnetic permeability μm and magnetostriction were measured at 5 MHz. The positive/negative (+ or −) of magnetostriction was determined from changes in BH characteristics upon stress application to the films. The results are also shown in Table 1.

Figure 7:
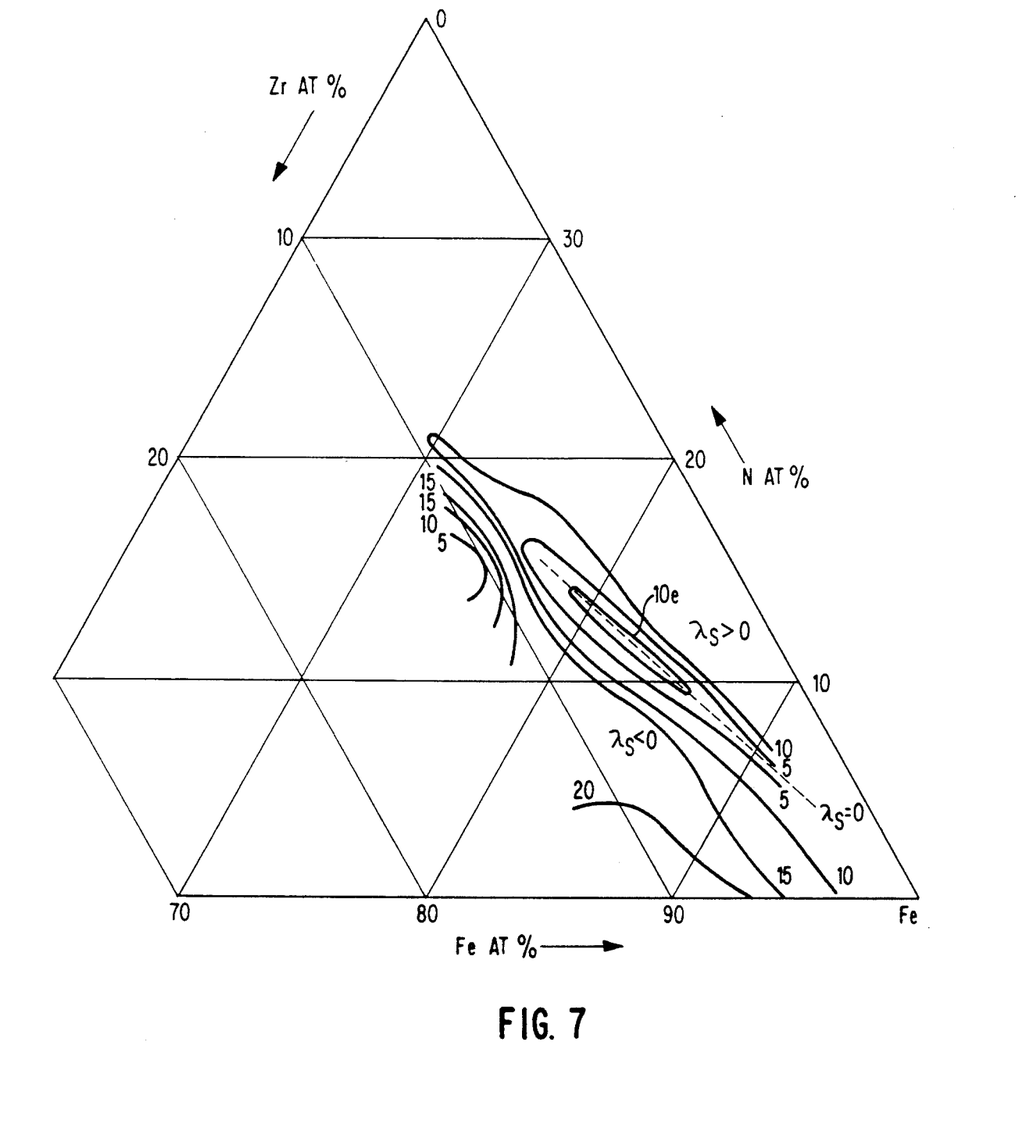
FIG. 7 is a diagram showing the positive/negative of magnetostriction and the relation between the coercivity Hc and the composition of the soft magnetic thin film prepared in a preparation example of a soft magnetic thin film.
Figure 8:
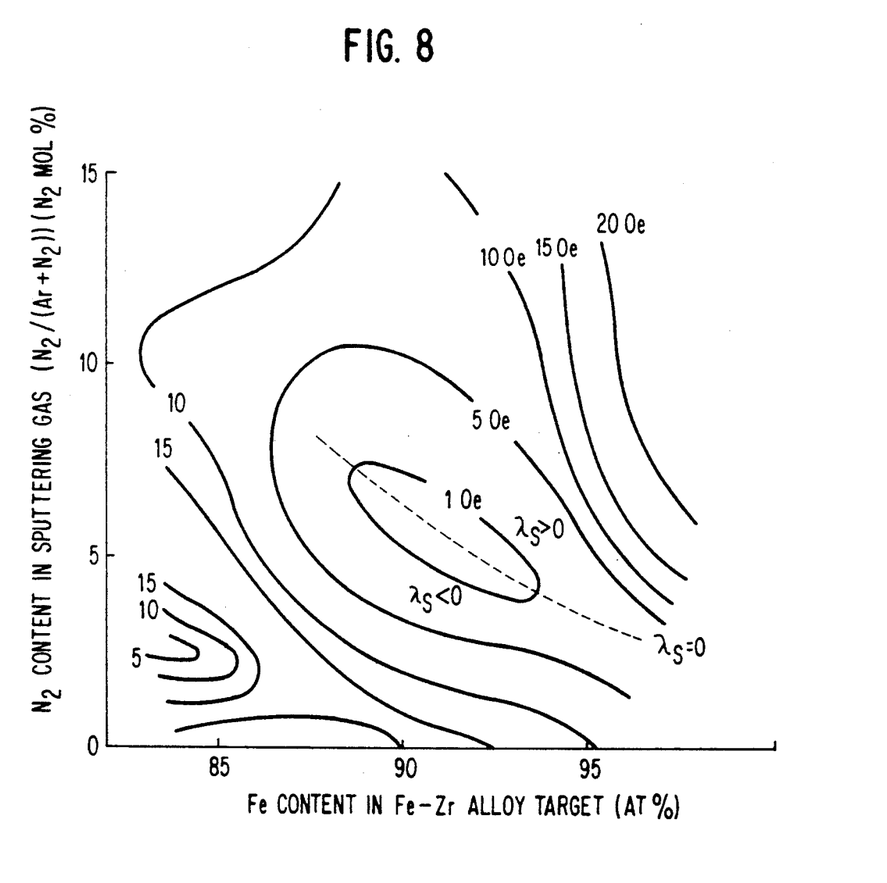
FIG. 8 is a graph showing the relation between certain manufacture conditions of the soft magnetic thin film and the coercivity Hc and saturation magnetostriction $\lambda s$ of the soft magnetic thin film manufactured under the manufacture conditions.

The relation between the coercivity Hc and the composition of the soft magnetic thin film produced by the above mentioned preparation example for producing the soft magnetic thin films and the polarity of magnetostriction is shown in FIG. 7, wherein a crystallized glass substrate was used and heat treatment was carried out at 550° C. The relation between the conditions for preparing soft magnetic thin films, that is the Fe content in the Fe-Zr alloy target and the $N_2$ content in the sputtering gas, coercivity Hc and saturation magnetostriction λs, is shown in FIG. 8, wherein a crystallized glass substrate was used and heat treatment was carried out at 550° C.

Figure 9:
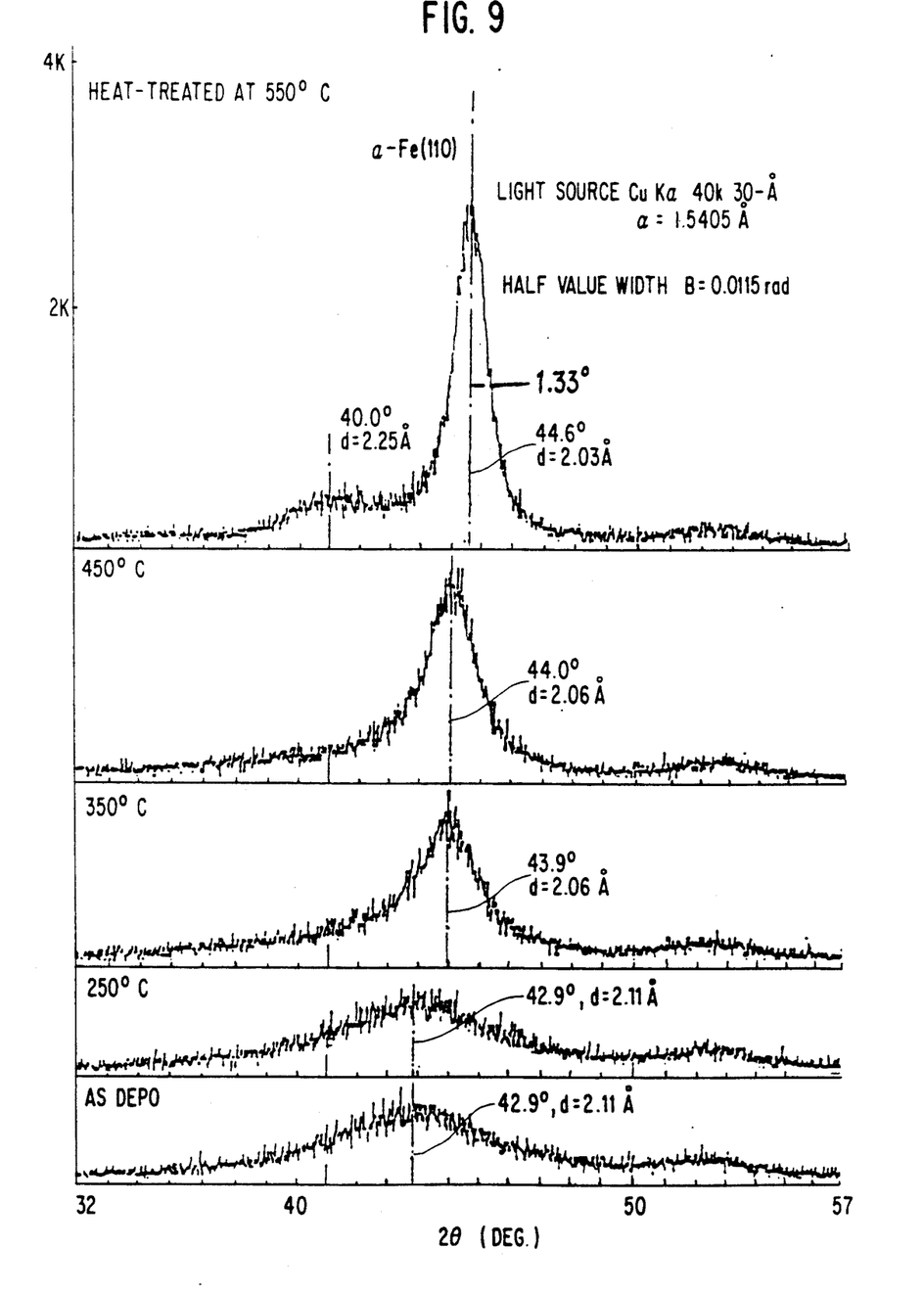
FIG. 9 is a graph showing the results of X-ray diffractiometry of several thin films manufactured under different heat treatment conditions.

For a composition $Fe_{80.9}Zr_{6.5}$ and $N_{12.6}$, among the preparation examples of the soft magnetic thin films, the results of X-ray analyses of the as-deposited thin film (not heat treated), and thin films heat treated at 250°, 350°, 450° and 550° C., are shown in FIG. 9, while the results of electrical resistivity are shown in Table 2. In FIG. 9, the crystal grain size of the thin film heat treated at 550° C. may be found from the half value width to be approximately 13 nm. It has also been found that the as-deposited thin film and the thin film heat treated at 250° C. are amorphous, while thin films heat treated at 350° C. and 450° C. are formed of crystallites and the thin film heat-treated at 550° C. are formed of crystallites grown further in the crystal size. It may be presumed that these crystallites contribute to soft magnetism of the thin film, and that generation of these crystallites is ascribable to the presence of N and Zr. Although the value of electrical resistivity of the thin film is lowered by raising the heat-treatment temperature, as may be seen from Table 2, the value is much higher than that for pure iron or permalloy and approximately equal to that of an Fe-Si alloy or sendust even if heat treatment is carried out by raising the temperature to 550° C. Thus the film may be used advantageously as a core of a magnetic head because of lower eddy current loss.

A Vickers hardness Hv was measured on a thin film of a composition $Fe_{80.9}Zr_{6.5}N_{12.6}$ and a value of Hv of 1000 (in kg/mm$^2$; 10 g load) was obtained. This value is much higher than that of sendust or Co-based amorphous alloy conventionally used as a magnetic head material (Hv=500 to 650), so that the value of wear resistance may be improved as compared with the values obtained with the conventional thin films.

Figure 10:
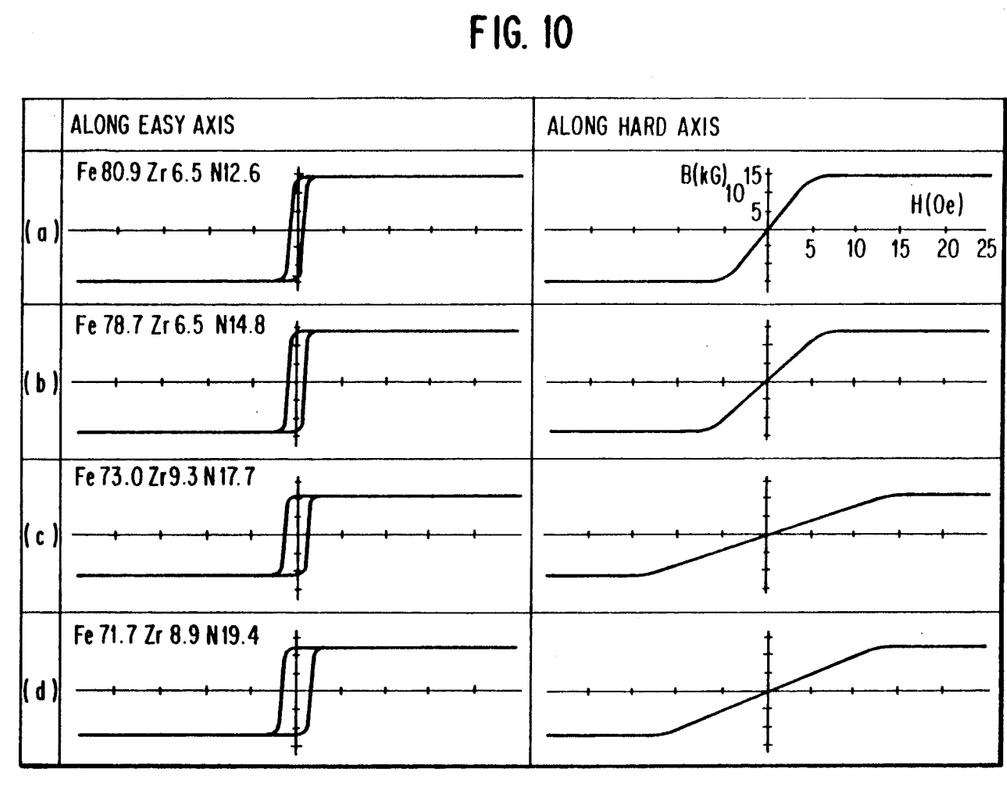
FIG. 10 is a graph showing alternate BH curves of several thin films having different compositions.

FIG. 10 shows BH curves of several thin films prepared in the same way as in the above mentioned examples of the soft magnetic thin films, as measured with an alternate BH tracer.

The samples shown in FIG. 10 have been heat-treated at 550° C. for 60 minutes in a 10 Torr $N_2$ atmosphere in a 1 kOe magnetic field following the film formation. It is seen from this figure that definite in-plane uniaxial anisotropy has been induced in the thin film by heat treatment in a magnetic field. Therefore, using the hard direction of the thin film as a direction of magnetization, magnetic permeability at a frequency higher than 1 MHz may be increased significantly. Thus the thin film may be used advantageously as a magnetic head material. Also, since the strength of the anisotropic magnetic field Hk is changed within a range of 3 to 18 Oe depending on the composition, the material may be selected in accordance to the magnitude of the magnetic permeability and the occasional frequency range. For example, if it is desired to obtain high magnetic permeability for a frequency not higher than 10 MHz, a composition with Hk=3 to 5 Oe is employed. A composition with a still higher value of Hk may also be employed so as not to deteriorate magnetic permeability at a higher frequency.

Figure 11:
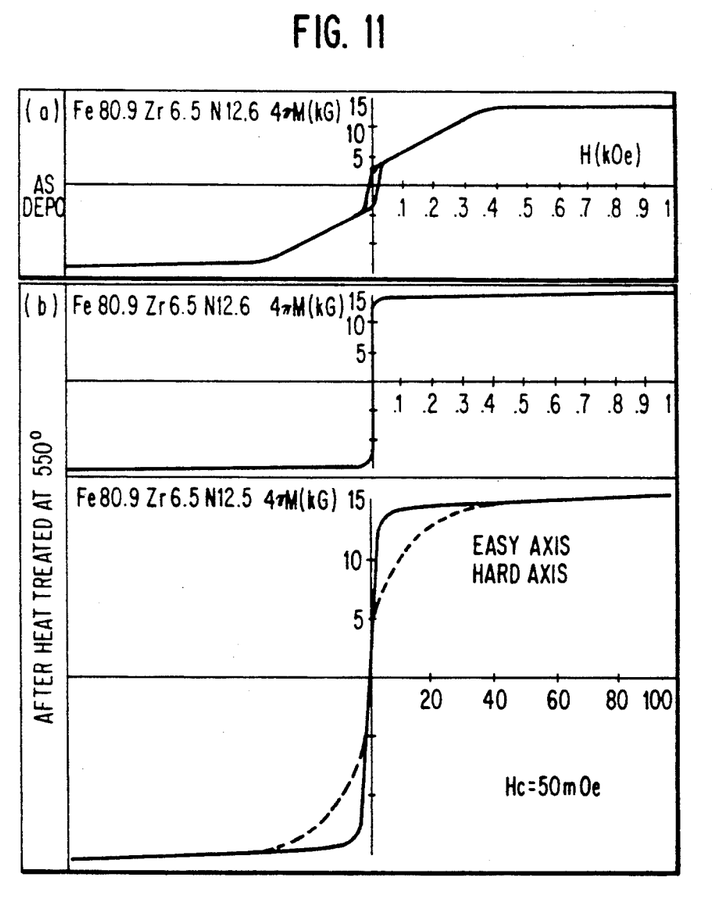
FIGS. 11(a)-(b) are graphs showing IH curves of a thin film before and after heat treatment, as measured by a VSM.

FIGS. 11(a)–(b) show the results of an IH curve for a thin film having a composition of $Fe_{80.9}Zr_{6.5}N_{12.6}$, among the thin films of the above mentioned preparation examples, as obtained by using a VSM. In this figure, FIG. 11(a) shows an IH curve for an as-deposited film and FIG. 11(b) an IH curve for a thin film after heat treatment at 550° C. (It is noted that demagnetization field correction was not made and the test sample size of 5 mm in diameter 0.63 μm in thickness was employed. The value of coercivity as measured with VSM is smaller by at least one digit than the value obtained with an alternate was determined from the curve in FIG. 11(b) to be approximately 50 mOe. This value is approximately equal to that of sendust or a Co-based amorphous alloy, thus proving that the thin film has superior soft magnetic properties. As may be seen from FIG. 11(b), $4\pi Ms=14.5$ KG, which value is sufficiently higher than that of sendust or Co-based amorphous alloy, thus proving that the thin film may be advantageously employed as a magnetic head material for recording on a high coercivity recording medium.

The value of $4\pi Ms$ of the as-deposited thin film is 13.0 KG which is slightly smaller than that of the heat-treated thin film. The as-deposited film exhibits perpendicular anisotropy (Hk about 400 Oe) and a higher value of Hc and thus film is only poor in soft magnetic properties.

Evaluation of corrosion resistance of a thin film having a composition of $Fe_{80.9}Zr_{6.5}N_{12.6}$, among the thin films of the above mentioned preparation examples, was made from changes in the surface state after dipping the film in city water for about one week. It was found that the present test sample remained completely unchanged and retained its mirror surface. For comparision, similar experiments were conducted on a $Co_{88.4}Nb_{8.0}Zr_{3.6}$ amorphous alloy film and an Fe-Si alloy (electro-magnetic steel sheet). It was found that the Co-Nb-Zr alloy also was unchanged, whereas the Fe-Si alloy was seen to be rusted on its entire surface. It is seen from above that the soft magnetic thin film, employed as a soft magnetic layer composite magnetic head, is also excellent in corrosion resistance.

A series of soft magnetic films with various compositions are shown in Table 3, in which Fe is partially replaced by the "M" element(s) with the measured values of saturated magnetostriction, saturated magnetic flux density Bs, anisotropy field strength Hk, coercivity Hc, and electric resistivity ρ. These soft magnetic films were prepared using targets of Fe-M-$Zr_{10}$ (M=Cr or Co), or targets of $Fe_{90}Zr_{10}$ with metal chips of V, Mn or Ni placed thereon, to form amorphous thin films of the Fe-M-Zr-N system (M=V, Cr, Mn, Co or Ni) through RF sputtering in 10% $N_2$-Ar atmosphere, followed by heat treating at 550° C. for 4 hours in a magnetic field.

A soft magnetic thin film having a composition outside the compositional range of the soft magnetic layer of the composite magnetic head of the above mentioned preferred embodiment is hereinafter explained.

Figure 12:
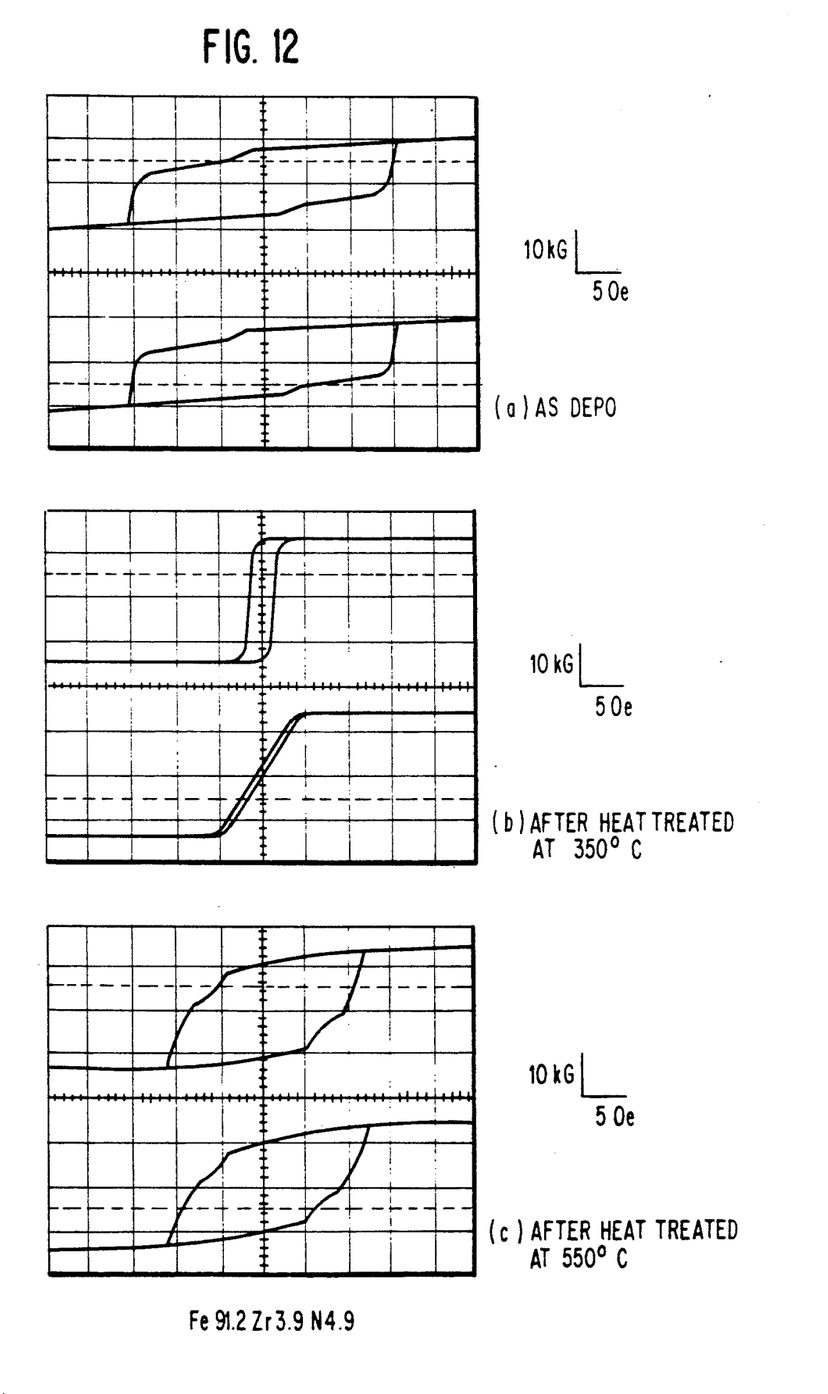
FIGS. 12(a)-(c) are graphs showing ac BH curves of a soft magnetic film having a composition outside the compositional range of a soft magnetic layer of a composite magnetic head embodying the present invention.

An amorphous alloy film with a composition of $Fe_{91.2}Zr_{3.9}N_{4.9}$ was formed and heat-treated for one hour at 350° C. and 550° C. in a magnetic field of 1 kOe. FIGS. 12(a) to (c) show BH curves, as measured by an alternate BH tracer, of as-deposited amorphous alloy films thus obtained. The as-deposited amorphous alloy film, which has not been heat treated, does not exhibit soft magnetism (FIG. 12(a)). The film obtained by heat treating the as-deposited film at 350° C. exhibits uniaxial anisotropy (FIG. 12(b)). However, the film obtained by heat treatment at 550° C. is deteriorated in its properties (FIG. 12(c)).

In preparing a magnetic head, fusion with molten glass (glass bonding) is frequently performed, usually by heating to a temperature in an order of 550° C. If the film of the above composition is employed, satisfactory soft magnetism is not displayed in the ultimately produced magnetic head, through the heating at the time of glass bonding. That is, with the above compositional range, only thermally unstable soft magnetic thin films can be obtained.

TABLE 1

| Preparation Examples | Target composition Fe | Target composition Zr | N₂ content in sputtering gas (mol %) | Composition of soft magnetic thin film [atomic percent] Fe | Composition of soft magnetic thin film [atomic percent] Zr | Composition of soft magnetic thin film [atomic percent] N | Bs [KG] | Hc [Oe] After heat treatment at 350° C. | Hc [Oe] After heat treatment at 550° C. | μ 5 MHz | Magnetostriction λs | Substrate |
|---|---|---|---|---|---|---|---|---|---|---|---|---|
| 1  | 95 | 5  | 0    | 96.3 | 3.7  | 0    | 14.6 | 11.2 | 10.6 | — | —        | crystallized glass |
| 2  | 95 | 5  | 2.5  |      |      |      | 16.2 | 2.4  | 3.2  | — | negative | substrate |
| 3  | 95 | 5  | 5.0  | 89.9 | 3.5  | 6.6  | 14.4 | 10.4 | 3.9  | — | —        | (PEG3130C, |
| 4  | 95 | 5  | 7.5  |      |      |      | 11.2 | 22.2 | 14.3 | — | —        | mfd. by HOYA) |
| 5  | 95 | 5  | 10.0 | 89.0 | 3.4  | 7.6  | 8.7  | 34   | 16.6 | — | —        | |
| 6  | 95 | 5  | 12.5 |      |      |      | 9.5  | 45   | 17.9 | — | —        | |
| 7  | 90 | 10 | 0    | 92.6 | 7.4  | 0    | 10.4 | 27   | 19.7 | — | —        | |
| 8  | 90 | 10 | 2.5  |      |      |      | 12.2 | 11.7 | 7.7  | — | negative | |
| 9  | 90 | 10 | 5.0  | 80.9 | 6.5  | 12.6 | 14.0 | 5.5  | 0.9  | — | ~0       | |
| 10 | 90 | 10 | 7.5  |      |      |      | 13.6 | 8.5  | 1.3  | — | ~0       | |
| 11 | 90 | 10 | 10.0 | 78.7 | 6.5  | 14.8 | 7.3  | 4.8  | 4.9  | — | positive | |
| 12 | 90 | 10 | 12.5 |      |      |      | 8.6  | 4.3  | 6.7  | — | —        | |
| 13 | 85 | 15 | 0    | 88.7 | 11.3 | 0    | 3.4  | 14.3 | 20   | — | —        | |
| 14 | 85 | 15 | 2.5  |      |      |      | 12.0 | 8.6  | 5.4  | — | —        | |
| 15 | 85 | 15 | 5.0  | 73.0 | 9.3  | 17.7 | 3.6  | 14.8 | 16.5 | — | —        | |
| 16 | 85 | 15 | 7.5  |      |      |      | 6.8  | 13.3 | 10.7 | — | —        | |
| 17 | 85 | 15 | 10.0 | 71.7 | 8.9  | 19.4 | 5.5  | 7.7  | 6.4  | — | —        | |
| 18 | 85 | 15 | 12.5 |      |      |      | 9.1  | 2.4  | 13.7 | — | —        | |
| 19 | 90 | 10 | 2.5  |      |      |      | 14.2 | 0.8  | 1.2  | — | negative | single-crystal |
| 20 | 90 | 10 | 5.0  | 80.9 | 6.5  | 12.6 | 13.4 | —    | 0.8  | 2260 | ~0     | sapphire substrate |
| 21 | 90 | 10 | 7.5  |      |      |      | 12.9 | 1.1  | 1.4  | — | ~0       | (R plane) |
| 22 | 90 | 10 | 10.0 | 78.7 | 6.5  | 14.8 | 14.8 | —    | 0.5  | 1190 | positive | |
| 23 | 90 | 10 | 12.5 |      |      |      | 12.9 | 4.9  | 10.5 | — | —        | |
| 24 | 85 | 15 | 2.5  |      |      |      | 12.3 | 1.0  | 1.0  | — | —        | |
| 25 | 85 | 15 | 5.0  | 73.0 | 9.3  | 17.7 | 10.0 | 5.7  | 1.2  | — | —        | |
| 26 | 85 | 15 | 7.5  |      |      |      | 12.5 | 1.0  | 1.5  | — | —        | |
| 27 | 85 | 15 | 10.0 | 71.7 | 8.9  | 19.4 | 10.4 | —    | 1.0  | 1450 | —      | |
| 28 | 85 | 15 | 12.5 |      |      |      | 8.3  | 1.2  | 12.2 | — | —        | |

TABLE 2

| Heat-treatment condition | Electrical resistivity ρ |
|---|---|
| as deposited | 159 μΩ · cm |
| 250° C. | 161 |
| 250 | 136 |
| 450 | 125 |
| 550 | 77 |

An amorphous layer, which is the soft magnetic thin film of the above mentioned composition, formed on a core block of an oxide magnetic material by the interposition of a reaction inhibiting layer, is produced and heat treated at, for example, a temperature of 350° to 650° C., to crystallize part or all of the amorphous layer. Even after such heat treatment, no reaction layer is formed between the ferrite core and the soft magnetic film due to the presence of the reaction inhibiting layer. A reaction inhibiting layer is preferably formed by inducing uniaxial magnetic anisotropy by heat treatment in a magnetic field and crystallizing part or all of the above mentioned amorphous layer. The thickness of the reaction inhibiting layer is determined in the following manner.

TABLE 3

Fe—M—Zr—N Films (heat treated at 550° C. × 4 hr in magnetic field)

| Films | Target[1] M | Target[1] m % | λ[2] 10⁻⁷ | Bs kG | Hk Oe | Hc Oe | ρ μΩ cm | Analyzed values Fe | Analyzed values M | Analyzed values Zr | Analyzed values N | Per total metals[3] Fe | Per total metals[3] M | Per total metals[3] Zr | N/Zr |
|---|---|---|---|---|---|---|---|---|---|---|---|---|---|---|---|
| No. 31 | V  | 9t   | +0.9 | 15.48 | 3.2 | 0.86 | 62.7  | 77.7 | 1.5  | 6.8 | 14.0 | 90.3 | 1.8  | 7.9 | 2.05 |
| No. 32 | V  | 17t  | +9.7 | 14.70 | 5.1 | 0.95 | 89.4  | 73.3 | 2.7  | 6.4 | 17.6 | 88.9 | 3.3  | 7.8 | 2.74 |
| No. 33 | V  | 25t  |      | 13.4  | 13.89 | 6.5 | 1.03 | 109.1 | 67.6 | 3.8 | 6.0 | 22.6 | 87.3 | 4.9 | 7.8 | 3.73 |
| No. 34 | Cr | 1.5  | +3.9 | 15.60 | 5.5 | 1.13 | 60    | 75.9 | 1.1  | 6.8 | 16.2 | 90.6 | 1.3  | 8.1 | 2.38 |
| No. 35 | Cr | 3.0  | +9.3 | 14.51 | 6.9 | 1.21 | 88    | 73.8 | 2.2  | 6.9 | 17.1 | 89.0 | 2.7  | 8.3 | 2.47 |
| No. 36 | Cr | 4.5  | +9.6 | 14.29 | 5.8 | 1.09 | 84    | 72.1 | 3.2  | 7.0 | 17.7 | 87.7 | 3.9  | 8.5 | 2.55 |
| No. 37 | Cr | 6.0  |      | 13.6  | 13.66 | 6.2 | 1.14 | 118.2 | 70.3 | 4.8 | 6.6 | 18.3 | 86.0 | 5.9 | 8.0 | 2.79 |
| No. 38 | Cr | 7.5  |      | 11.3  | 13.59 | 5.1 | 1.14 | 108.2 | 69.5 | 6.0 | 6.6 | 17.9 | 84.7 | 7.3 | 8.0 | 2.72 |
| No. 39 | Cr | 9.0  |      | 9.8   | 13.16 | 4.5 | 1.14 | 108.7 | 68.9 | 7.0 | 6.8 | 17.3 | 83.3 | 8.5 | 8.2 | 2.53 |
| No. 40 | Mn | 9t   |      | 10.7  | 13.28 | 6.5 | 1.75 | 115.9 | 68.8 | 5.4 | 6.0 | 19.8 | 85.7 | 6.8 | 7.5 | 3.30 |
| No. 41 | Mn | 17t  |      | 12.6  | 11.62 | 5.3 | 1.55 | 139.5 | 63.5 | 10.2 | 5.6 | 20.7 | 80.0 | 12.9 | 7.1 | 3.68 |
| No.    | Mn | 25t  | +8.6 | 11.15 | 4.5 | 1.47 | 136.1 | 60.6 | 13.6 | 5.4 | 20.4 | 76.2 | 17.1 | 6.8 | 3.79 |

TABLE 3-continued

Fe—M—Zr—N Films (heat treated at 550° C. × 4 hr in magnetic field)

| Films | Target[1] M | m % | λ[2] 10⁻⁷ | Bs kG | Hk Oe | Hc Oe | ρ μΩ cm | Analyzed values Fe | M | Zr | N | Per total metals[3] Fe | M | Zr | N/Zr |
|---|---|---|---|---|---|---|---|---|---|---|---|---|---|---|---|
| No. 42 | Co | 1.5 | +0.6 | 15.85 | 2.1 | 1.07 | 46 | 81.0 | 1.4 | 6.6 | 11.0 | 91.1 | 1.5 | 7.4 | 1.66 |
| No. 43 | Co | 3.0 | +4.7 | 16.06 | 4.1 | 1.19 | 47 | 79.9 | 2.8 | 6.8 | 10.5 | 89.3 | 3.1 | 7.6 | 1.55 |
| No. 44 | Co | 4.5 | +9.0 | 16.21 | 7.1 | 1.11 | 49 | 74.7 | 4.0 | 6.5 | 14.8 | 87.6 | 4.7 | 7.7 | 2.27 |
| No. 45 | Ni | 9t | | 10.0 | 15.13 | 3.9 | 0.98 | 61.8 | 76.7 | 7.2 | 6.5 | 9.6 | 84.8 | 8.0 | 7.2 | 1.47 |
| No. 46 | Ni | 17t | +8.8 | 10.22 | 4.6 | 4.58 | 84.3 | 72.4 | 12.9 | 6.3 | 8.4 | 79.1 | 14.1 | 6.9 | 1.34 |
| No. 47 | Ni | 25t | | 12.6 | 8.82 | 3.5 | 2.90 | 94.7 | 68.3 | 18.4 | 6.0 | 7.3 | 73.7 | 19.8 | 6.5 | 1.22 |
| No. 48 Comp. Ex. | | 0 | −2.5 | 16.10 | 1.3 | 1.01 | 50.6 | 83.2 | 0.0 | 7.1 | 9.7 | 92.2 | 0.0 | 7.8 | 1.38 |

*[1]Target: $Fe_{90-m}\%Zr_{10}$. Suffix t represents number of chips of M elements placed on the $Fe_{90}Zr_{10}$ target.
*[2]λ = magnetostriction
*[3]proportion of elements per the total metal elements If the gap length a, gap depth c and the track width d of the magnetic gap of a magnetic head to be produced are selected to be 0.2 μm, 10 μm and 25 μm, respectively, the thickness b of the reaction inhibiting layer may be found to be b≦16 nm, from the formula bcd/a≦0.2×10⁻¹⁰ m². The value of the thickness b is selected to be b=10 nm, as an example, from economical considerations and in view of the fact the value of the thickness b as large as possible is desired. This value is selected to be b=10 nm, as an example, whereas, if film formation is to be achieved in a shorter time, the value b=5 nm is selected, as an example.

FUNCTION

With the composite magnetic head in which the dimensions a, c and d of the magnetic gap and the thickness of the reaction inhibiting layer b satisfy the relation bcd/a≦0.2×10⁻¹⁰ m², waviness (beat) signals in the reproduced signals not higher than 1 dB may be achieved at the time of reproduction of signals recorded on the magnetic recording medium, which is fully acceptable as the performance of the electro-magnetic transducer element at the time of reproduction.

In addition, in the case of a composite magnetic head for reproducing recording on a magnetic recording medium of a high recording density with an extremely small track width d, or of a non-sliding composite magnetic head for HDD with an extremely small gap depth c, the thickness b of the reaction inhibiting layer is selected to an extremely large value by being defined in accordance with the above formula, so that a composite magnetic head may be provided in which the reaction inhibiting layer thick enough to prevent reaction between the oxide magnetic material and the soft magnetic film may be formed and in which reproduced signals of practically acceptable quality may be produced.

EXAMPLE

A magnetic core of a recording/reproducing composite magnetic head embodying the present invention will be explained by referring to FIG. 1 which is an enlarged perspective view of an end part of the magnetic core.

Figure 1:
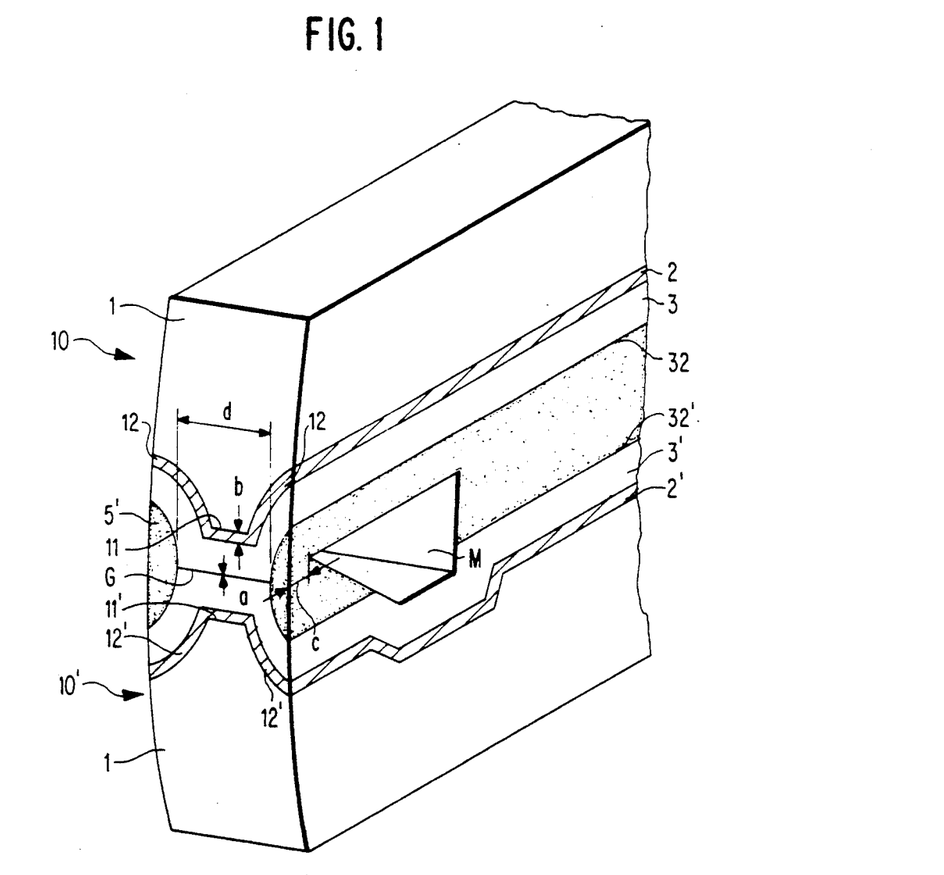
FIG. 1 is a perspective view of a magnetic core showing the construction of a composite magnetic head embodying the present invention.

Referring to FIG. 1, the magnetic core shown therein is formed of separate magnetic core halves 10, 10' fused together by charged sections 5, 5' of fused glass material.

Ferrite cores 1, 1' of a magnetic material, constituting a major portion of the magnetic core halves 10, 10', include opposing surface 11, 11' on abutment sides of the magnetic core halves 10, 10', at the distal ends of which a magnetic gap G is formed, and receded surfaces 12, 12' extending from the opposing surfaces 11, 11' in a direction away from the abutment surfaces.

Reaction inhibiting layers 2, 2', formed of $SiO_2$ and each having a thickness b (=5 nm), are formed on the opposing surfaces 11, 11' and the receded surfaces 12, 12', over the entire abutment surfaces of the magnetic core halves. On the surfaces of the reaction inhibiting layers 2, 2', there are formed soft magnetic metal films 3, 3', each having a composition $Fe_{80.9}Zr_{6.5}N_{12.6}$ by a thin film forming technique. The soft magnetic metal films 3, 3', in conjunction with the core blocks 1, 1' of the magnetic oxide material, constitute a part of the magnetic core of the magnetic core halves 10, 10' of the composite magnetic head. In assembling the magnetic core, the magnetic core halves 10, 10' are placed in abutment with each other, with the soft magnetic metal layers 3, 3' on their surfaces facing each other. The core halves 10, 10' are then fused together by the glass materials 5, 5' charged in recesses 32, 32' of the magnetic core halves 10, 10', defined by magnetic layers 3, 3' disposed on the receded surfaces 12, 12' of the ferrite core blocks 1, 1'. A winding slot M is formed in a part of the glass bonding region of the magnetic core halves 10, 10' as a through-slot passing through the magnetic core.

A magnetic gap G, formed of a glass material, is formed on an end part faced by a magnetic recording medium of a part of the abutting regions of the magnetic films 3, 3' provided on the opposing surfaces 11, 11' of the ferrite cores 1, 1'. A gap length a, which is the size if the magnetic gap G as measured in the preceeding direction of the magnetic recording medium placed in opposition to the composite magnetic head, is selected to be 0.2μ, a track width d, which is a width of the magnetic gap G in a direction perpendicular thereto is selected to be 25 μm and a gap depth c, which is a depth of the magnetic gap as measured in a direction perpendicular to the surface of the recording medium, is selected to be 20 μm.

Figure 4:
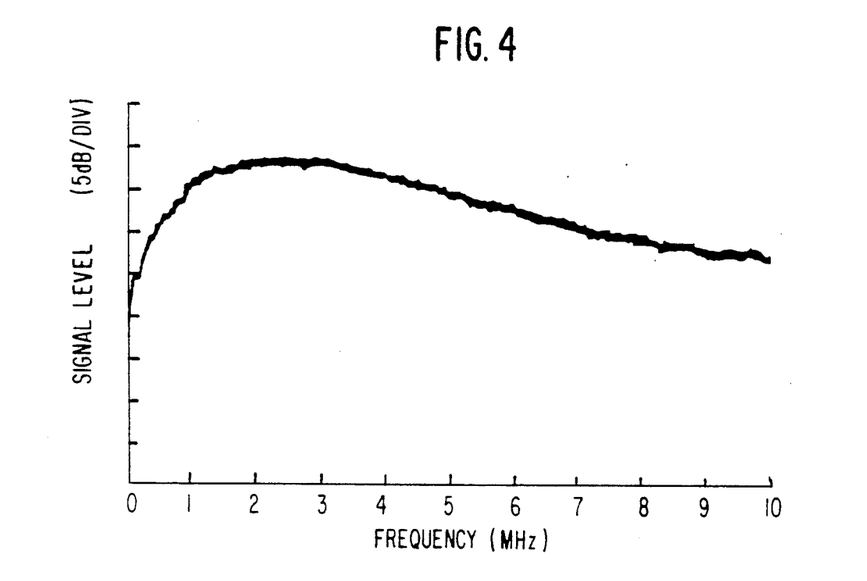
FIG. 4 is a graph showing frequency characteristics of reproduced signals of the composite magnetic head embodying the present invention.

FIG. 4 shows frequency characteristics of reproduced signals outputted from the composite magnetic head of the present example. As shown therein, the waviness (beat) component in the reproduced signal is so small as to be practically negligible, so that the reproduced signals of satisfactory signal quality are obtained.

In preparing the magnetic core of the recording/reproducing magnetic head of the present embodiment, the gap length a, gap depth c and the track width d of the magnetic gap are determined by taking into account the recording wavelength and the track width of the magnetic recording medium placed in opposition to the composite magnetic core, as well as the service life of the core against wear, while the thickness b of the reaction inhibiting layer is selected to satisfy the relation $$bcd/a \leq 0.2 \times 10^{-10} m^2.$$

As described hereinabove, with the composite magnetic head with extremely small values of the gap depth c and the track width d, the thickness b of the reaction inhibiting layer may be selected at a larger value, so that it becomes possible with the reaction inhibiting layer with the thus selected thickness b to prevent reaction between the core block formed of the magnetic oxide material and the thin films formed of the soft magnetic metal material.

It should be noted that modifications may be done without departing from the gist and scope as herein disclosed and claimed in the accompanying claims.

What is claimed is:

1. A composite magnetic head comprising a pair of magnetic core halves each including a core block formed of an oxide magnetic material and a soft magnetic thin film disposed on said core block inter posed with a reaction inhibiting layer, said core halves abutting to each other so that a magnetic gap is defined between the ends of said soft magnetic thin films, wherein the magnetic head has a size relation $$bcd/a \leq 0.2 \times 10^{-10} m^2$$

wherein a is a gap length, as measured along the proceeding direction of a magnetic recording medium, c a gap depth as measured in the direction normal to the surface of said magnetic recording medium, d a gap width as measured along the track width of said magnetic recording medium, and b is a thickness of said reaction inhibiting layer.

2. The composite magnetic head according to claim 1, wherein $d \leq 10 \times 10^{-6} m$.

3. The composite magnetic head according to claim 1, wherein $c \leq 5 \times 10^{-6} m$.

4. The composite magnetic head according to claim 1, wherein b is at least $2 \times 10^{-9} m$ (20 Angstrom).

5. The composite magnetic head according to claim 1, which has waviness of output signal in terms of not more than 1 dB.

6. The composite magnetic head according to claim 5, in which said waviness is maintained up to a frequency of 10 MHz.

7. The composite magnetic head according to claim 1, wherein the soft magnetic thin film has a composition of $Fe_p Zr_q N_r$, where $0 < q \leq 20$ and $0 < r \leq 22$ excluding the ranges $q \leq 7.5$ and $r \leq 5$ provided that $p+q+r=100$ in atomic percent.

8. The composite magnetic head according to claim 7, wherein the soft magnetic film has a composition of $Fe_p Zr_q N_r$, where $69 \leq p \leq 93$, $2 \leq q \leq 15$ and $5.5 \leq r \leq 22$ provided that $p+q+r=100$ in atomic percent.

9. The composite magnetic head according to claim 7, wherein up to 30 atomic percent of Zr is replaced by at least one of Hf, Ti, Nb, Ta, V, Mo and W, and/or up to 30 atomic percent of Fe is replaced by at least one of Co, Ni and Ru.

10. The composite magnetic head according to claim 1, wherein the soft magnetic film has a composition of $Fe_s(ZrN_{1-t})_{100-s}$ where $77 \leq s \leq 88$ and $0.3 \leq t \leq 0.38$.

11. The composite magnetic head according to claim 1, wherein the soft magnetic film has a composition of $Fe_{p-m}M_m B_q N_r$ where p, q, r and m represent atomic percent, M represents at least one of Co, Ru, Cr, V, Ni, Mn, Pd, Ir and Pt, and B represents at least one of Zr, Hf, Ti, Nb, Ta, Mo and W, and $0 \leq m/p < 0.3$ $0 < q \leq 20$ $0 < r \leq 22$ provided that the range of $q \leq 7.5$ and $r \leq 5$ is excluded.

* * * * *